Sept. 23, 1952      T. H. WIANCKO      2,611,266
FORCE GAUGE
Filed April 29, 1948

INVENTOR:
THOMAS H. WIANCKO
BY
Reed C Lawlor
AGENT.

Patented Sept. 23, 1952

2,611,266

UNITED STATES PATENT OFFICE 2,611,266

FORCE GAUGE

Thomas H. Wiancko, Altadena, Calif., assignor to Wiancko Engineering Company, a corporation of California Application April 29, 1948, Serial No. 23,900

11 Claims. (Cl. 73—141)

My invention relates to improvements in force gauges, and more particularly to improvements in force gauges of the ring type.

A force gauge of the type to which my invention is particularly applicable comprises a ring which is provided with means for attachment between two objects or other members which are relatively movable by means of a force applied therebetween. In order to measure such a force with such a force gauge, the degree of deformation of the ring is measured.

An object of my invention is to provide such a force gauge of rugged construction, high sensitivity, and of great reliability.

Another object of my invention is to provide such a force gauge which is substantially insensitive to shearing and bending forces so that it gives an indication which depends only on the lineal or diametrical force applied between the points of attachment.

The foregoing and other objects and advantages of my invention will become apparent from a reading of the following detailed description in connection with the accompanying drawing which illustrates a single embodiment thereof and in which.

Figure 1:
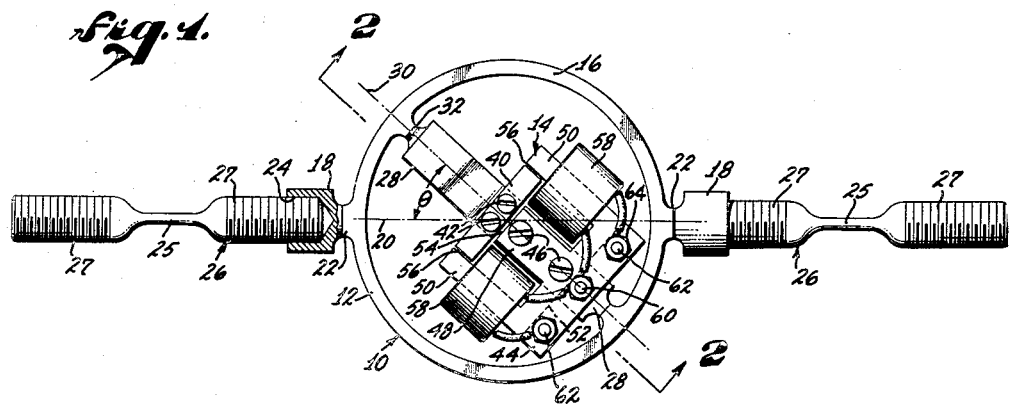
Figure 1 is a plan view of a force gauge embodying the features of my invention.
Figure 2:
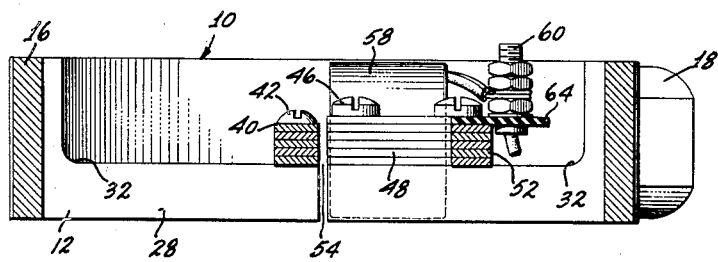
Figure 2 is a sectional view of the force gauge taken on the plane 2—2 of Figure 1.
Figure 3:
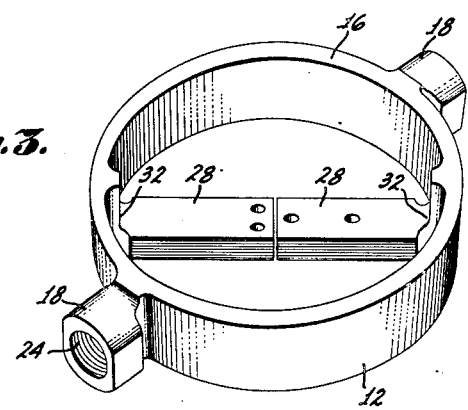
Figure 3 is a perspective view of the main body of the force gauge.

Referring to the drawing, and particularly to Figures 1 to 3 inclusive, there is illustrated a force gauge 10 comprising a body member 12 which deforms when a force is applied thereto, and a magnetic structure 14 for measuring the deformation. The body member is in the form of a circular ring 16 which is provided with two outwardly extending bosses 18 at opposite ends of a first diameter 20. The bosses 18 are formed integrally with the ring 16, and are attached directly thereto by means of constricted necks 22 having widths about equal to, or about double the annular thickness of the ring. The bosses 18 are provided with coaxially aligned female threads 24 by means of which the force ring 10 is attached to two flexure hinges 26. Each of the flexure hinges is provided with a narrow cylindrical part 25 interconnecting two threaded ends 27.

Two flat arms 28, also formed integrally with the ring 16, are connected to the inner surface thereof at points at opposite ends of a second diameter 30 forming an angle $\theta$ with the first diameter. The arms 28 are connected with the ring by means of constricted necks 32 having widths about equal to the annular thickness of the ring 16. The two arms 28 extend substantially radially inwardly and preferably terminate adjacent the center of the ring.

The entire body member 12, including the ring 16, the bosses 18, and the arms 28, are formed of a single block of metal. Preferably in order to render the sensitivity of the force gauge substantially independent of the temperature of the medium in which it is operated, the metal selected for this purpose is an iso-elastic alloy, such as Ni-Span-C, which has a Young's modulus which does not vary appreciably with temperature.

In order to measure a force which appears between two objects such as a rocket motor and a stand upon which it is mounted, the two objects are attached to the outer ends of the respective flexure hinges 26. When a force is applied between the two hinges along the first diameter 20 the ring 16 is deformed, causing it to assume an oval configuration. This deformation causes the two arms 28 to pivot or swing parallel to the plane of the ring 16 about opposite ends of the second diameter 30. The displacement or relative change of spacing of the inner ends of the arms is a measure of the force producing the deformation. In the embodiment of the invention illustrated, this relative change of spacing is measured by means of the magnetic structure 14 as more fully described hereinbelow.

Prior to my invention, the deformation of the ring of such a force has been measured only by means of arms or the like, arranged parallel to the axis 20 or perpendicular to this axis. I have now found that the sensitivity of a force gauge of the type described, that is, the ratio of the displacement between the inner ends of the arms to the force applied, is increased by arranging the two diameters 20 and 30 at an oblique angle and as far as I know, my force gauge is the first one in which the arms have been arranged at an angle which is oblique to the axis of the applied force. In fact, I have found that the sensitivity is a maximum when the oblique angle $\theta$ is equal to about 45°.

When employing flexure hinges for attaching the force gauge between the two objects, the effects of bending forces are largely reduced. I have discovered, however, that the effect of both bending forces and shearing forces can be substantially eliminated by choosing a value of $\theta$ which is slightly less than 45°, depending to some extent upon the thickness of the ring 16 relative to its diameter, and also the widths of the necks 22 interconnecting the bosses 18 and the ring. By actual tests, I have found that an angle $\theta$ equal to 41.5° renders the displacement between the inner ends of the arms 28 substantially independent of bending and shearing moments applied to the bosses for annulus thicknesses between about 0.28 and 0.16 of the ring radius. Thus by employing a force gauge in which the arms are arranged at such an angle, and also employing flexure hinges, readings of diametrical forces are obtained which are substantially free of errors due to the presence of bending and shearing moments.

The effects of bending forces may also be largely eliminated by employing universal couplings instead of flexure hinges for making the connections. However, flexure hinges are preferred for this purpose since they form a substantially conservative system free of errors that would otherwise be caused by friction.

Preferably the lateral displacement between the inner ends of the arms 28 is measured by means of a magnetic structure 14 forming a differential system. The particular magnetic structure 14 illustrated comprises an I-shaped member 40 secured transversely to the inner end of one of the arms 28 by means of two screws 42. The magnetic structure 14 also comprises an E-shaped member 44 secured to the other arm 28 by means of two screws 46. The E-shaped member 44 comprises a center leg 48 and two outer legs 50 arranged in substantially parallel relationship and interconnected by an end or cross piece 52. The screws 46 pass through the center leg 48 in order to secure the E-shaped member to the corresponding arm 28.

The inner end of the center leg 48 is spaced slightly from the center portion of the I-shaped member 40, thereby forming a central air gap 54, and the outer legs lie outside of, but adjacent to, the extremities of the I-shaped member, thereby forming two outer air gaps 56. Two coils 58 having equal numbers of turns, are mounted upon the outer legs 50. Two ends of the respective coils 58 are connected to a common, center, binding post 60 and the other ends of the two coils are connected to corresponding outer binding posts 62. The binding posts are mutually insulated in any convenient manner such as by being mounted upon an insulating member 64 fastened to the E-shaped member 44.

When a diametrical force is applied between the bosses 18, the ring 16 deforms and the two arms 28 pivot at the necks 32 as hereinbefore described, causing the thickness of one of the end air gaps 56 to increase, and the thickness of the other end air gap 56 to decrease, without however, substantially affecting the thickness of the central air gap 54. The resultant changes in reluctance of the flux paths associated with the corresponding respective coils 58 cause the self-inductance of one coil to decrease and self inductance of the other coil to increase. The resultant change in the difference of inductance between the two coils 58 is a measure of the changes in thickness of the end air gaps 56, and hence is a measure of the force causing that change.

For maximum effectiveness the two magnetic members 40 and 44 are formed of laminated soft-ferromagnetic material. Also for maximum effectiveness, the thickness of the center gap 54 is relatively small compared to the thickness of the outer gaps 56, and the area of the center gap 54 is made relatively large so that changes in reluctance of the center gap are practically negligible. The thickness of the end gaps 56 at zero load is designed to be about three times the deflection of the ring which corresponds to the maximum load that the particular force gauge is designed to measure. The importance of this relationship can be appreciated when it is realized that the change in gap thickness is about twice the change in the diameter of the ring when $\theta=45°$ approximately.

The effects of bending force applied about an axis parallel to the plane of the ring 16 are minimized by locating the end air gaps 56 approximately on a common diameter.

Figure 4:
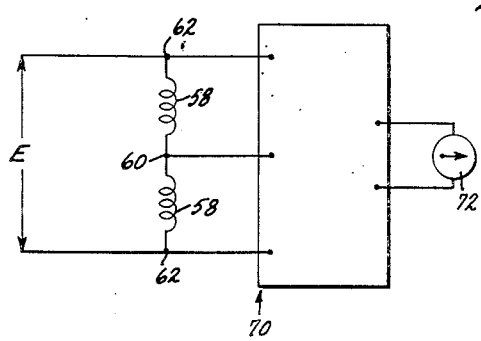
Figure 4 is a schematic wiring diagram of a circuit for metering a force applied to the force gauge.

In any event, the changes in the differences of the inductance of the coils 58 and hence a diametrical force applied between the bosses 18, may be measured in any conventional manner such as by means of a Wheatstone bridge circuit 70, or other metering circuit, including an output meter 72 as illustrated in Figure 4. The detailed arrangements of such circuits and their calibration are very well known to those skilled in the art and need not be particularly described herein.

In summary, it may be stated briefly that the main features of my invention which contribute to its success reside in the integral construction of the gauge body, the geometrical arrangement of its parts, and the use of a differential magnetic structure. Although but one embodiment of the invention employing all of these features in combination has been illustrated and described, it will be obvious that these features may be employed in other combinations and that many changes and modifications in form, material, and relative arrangement of parts, which will now be apparent to those skilled in the art, may be made without departing from the principles of my invention. In particular it is to be understood that many of the advantages of my invention can be obtained by employing other types of displacement measuring systems. For example, by mounting a permanent magnet member on one arm and a coil on the other, the rate of change of force applied to the gauge can be measured. Also, of course, the advantages of the magnetic structure as a means for measuring force may be obtained even though the preferred geometrical and integral arrangement of the force gauge body is not employed. Reference is therefore made to the appended claims to ascertain the limits of the invention.

I claim:

1. A force gauge comprising a ring, attachment means located on said ring at points at opposite ends of one diameter of said ring whereby said ring is deformed in response to a force acting therebetween, a pair of arms extending inwardly from the ring from points at opposite ends of a second diameter forming an oblique angle with said first diameter, said angle being substantially different from 90°, the free ends of said arms being deflected in opposite directions transverse to said second diameter upon change in the amount of such force applied to the ring, and displacement sensing means responsive to changes in the relative displacement of said arms in a direction transverse to said second diameter for measuring changes in such force.

2. A force gauge as defined in claim 1 wherein said oblique angle equals about 41.5°.

3. A force gauge comprising a ring, attachment means located on said ring at points at opposite ends of one diameter of said ring whereby said ring is deformed in response to a force acting therebetween, a pair of arms extending radially inwardly from the ring along a second diameter forming an oblique angle with said first diameter, said angle being substantially different from 90°, said arms terminating adjacent the center of the ring, the free ends of said arms being deflected in opposite directions transverse to said second diameter upon change in amount of such force applied to the ring, and displacement sensing means attached to the inner ends of said arms and responsive to changes in the relative positions of the inner ends of said arms in a direction transverse to said second diameter for measuring changes in such force.

4. A force gauge as defined in claim 3 wherein said oblique angle equals about 41.5°.

5. A force gauge comprising a ring, attachment means located on said ring at points at opposite ends of one diameter of said ring whereby said ring is deformed in response to a force acting therebetween, a pair of arms extending radially inwardly from the ring along a second diameter forming an oblique angle with said first diameter, said angle being substantially different from 90°, said arms rotating in opposite directions upon change in the amount of such force applied to the ring, and means including an impedance that varies in accordance with relative rotation of said arms for determining changes in said force.

6. A force gauge comprising a ring, attachment means located on said ring at points at opposite ends of one diameter of said ring whereby said ring is deformed in response to a force acting therebetween, a pair of arms extending radially inwardly from the ring along a second diameter forming an oblique angle with said first diameter, said angle being substantially different from 90°, the free ends of said arms being deflected in opposite directions transverse to said second diameter upon change in the amount of such force applied to the ring, a pair of adjacent elements mounted upon the respective arms and respectively movable therewith in opposite directions along an axis transverse to said second diameter upon change in the amount of such force applied to the ring, and means including a variable impedance controlled by relative movement of said elements in such opposite directions for determining changes in such force.

7. A force gauge comprising, a ring, attachment means located on said ring at points at opposite ends of one diameter of said ring whereby said ring is deformed in response to a force acting therebetween, a pair of arms extending radially inwardly from the ring along a second diameter forming an oblique angle with said first diameter, said angle being substantially different from 90°, the free ends of said arms being deflected in opposite directions transverse to said second diameter upon change in the amount of such force applied to the ring, a pair of soft-ferromagnetic elements mounted upon the respective arms and defining an air gap having a flux axis substantially perpendicular to said second diameter, and a coil mounted on one of said elements having an inductance which varies in accordance with the width of said air gap.

8. A force gauge comprising: a ring; attachment means located on said ring at points at opposite ends of a first diameter of said ring whereby said ring is deformed in response to a force acting therebetween; a pair of arms extending inwardly from the ring from diametrically opposite points thereof, said points lying on a diameter that forms an oblique angle substantially different from 90° with said first diameter, the free ends of said arms being deflected in opposite directions transverse to said second diameter upon change in the amount of such force applied to the ring; a pair of soft-ferromagnetic elements mounted upon the respective arms and defining a pair of air gaps, one of which increases and the other of which decreases in width in accordance with such deflection; and coils operatively associated with the respective air gaps having impedances which vary therewith whereby the difference of impedance of said coils varies with such deflection.

9. A force gauge as defined in claim 8 wherein said oblique angle equals about 41.5°.

10. In a force gauge which includes a ring having attachment means located at points thereon at opposite ends of a diameter whereby the ring is deformed in response to opposing radial forces applied to the ring at said points, the combination therewith of a gauge arm attached at a third point of said ring, said third point being located at a position thereon forming an oblique angle at the center of said ring with said diameter, said oblique angle differing substantially from 90°, a part of said arm remote from said third point being movable in a direction substantially perpendicular to a line joining said part with said third point, and means including a displacement sensing element secured to said ring at a point thereof diametrically opposite said third point and responsive to said movement for measuring the force applied to the ring.

11. A force gauge comprising: a ring; attachment means located on said ring at points at opposite ends of a first diameter of said ring whereby said ring is deformed in response to a force acting therebetween; a pair of arms extending radially inwardly from the ring and along a second diameter forming an oblique angle substantially different from 90° with said first diameter; an E-shaped magnetic member mounted on one of said arms, said E-shaped magnetic member having a center leg and two outer legs arranged in substantially parallel relationship; an I-shaped magnetic member mounted on the other of said arms and between the outer legs of said E-shaped member, said I-shaped member defining two air-gaps between the respective ends thereof and the outer legs of said E-shaped member, the two gaps simultaneously varying in opposite ways in accordance with the degree of deformation of said ring, said I-shaped member also defining an air-gap with the center leg of said E-shaped member; and a pair of coils mounted upon the respective outer legs of said E-shaped magnetic member whereby changes in the difference in thicknesses of said two air-gaps can be detected.

THOMAS H. WIANCKO.

REFERENCES CITED

The following references are of record in the file of this patent:

UNITED STATES PATENTS

| Number | Name | Date |
|---|---|---|
| 1,927,478 | Whittemore et al. | Sept. 19, 1933 |
| 2,005,889 | Dillon et al. | June 25, 1935 |
| 2,408,524 | Mestas | Oct. 1, 1946 |
| 2,421,626 | Kuehni | June 3, 1947 |
| 2,453,551 | Statham | Nov. 9, 1948 |